May 31, 1966     A. C. BALLAUER ETAL     3,253,474
SPACER MOUNTING APPARATUS FOR BELT-DRIVE ENGINE INSTALLATIONS
Filed Jan. 10, 1964     2 Sheets-Sheet 1

INVENTOR
ALB C. BALLAUER AND
ROBERT J. BRETL
BY
*Jerome A. Gross*
ATTORNEY

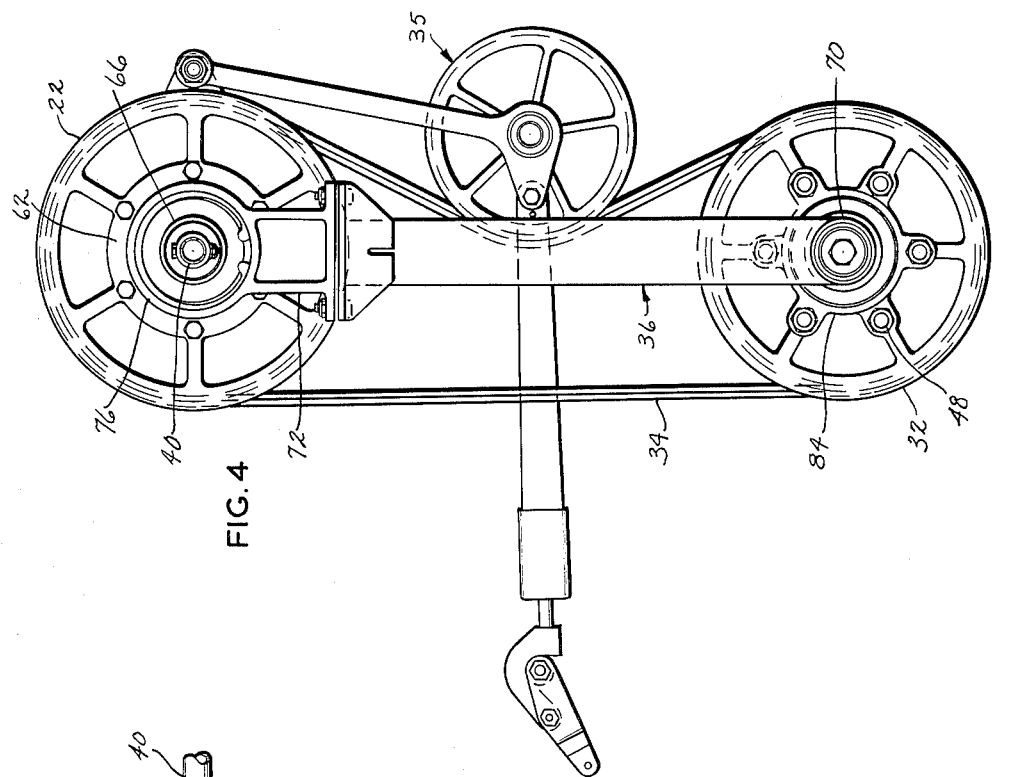
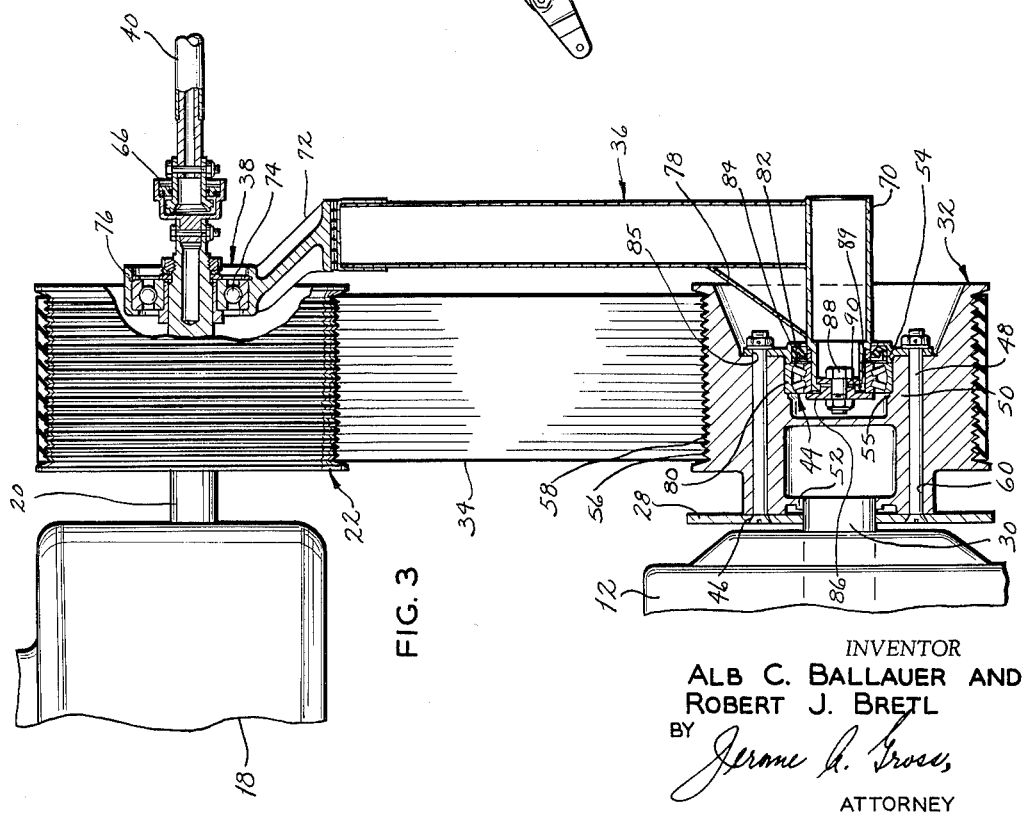

United States Patent Office 3,253,474
Patented May 31, 1966

3,253,474
SPACER MOUNTING APPARATUS FOR BELT-DRIVE ENGINE INSTALLATIONS
Alb C. Ballauer and Robert J. Bretl, Menominee, Mich., assignors to R. J. Enstrom Corporation, Menominee, Mich., a corporation of Michigan
Filed Jan. 10, 1964, Ser. No. 337,060
9 Claims. (Cl. 74—228)

The present invention relates generally to means for supporting the belt drive of an aircraft engine installation and more particularly to a spacer strut and associated bearing assembly, especially useful in helicopter power systems. It has particular value in adapting, to installation within helicopters, of aircraft engines complete with their specially-correlated shock-mounts of the type which avoid coupling between impulsion and reactions about the several reference axes, such as the familiar "Dynafocal" mounts.

In any helicopter engine installation, especially those utilizing belt drives, there must be no rigid prevention of oscillatory movements; at least limited movements of the belt-drive end of the engine must be permitted. Where the engine and belt-drive assembly take on characteristics of rigidity or excessive restraint, resilient engine mountings cannot function properly and excessive bending moments in the engine crankshafts may result. Furthermore, oscillatory impulses at the engine may become "coupled" and be conveyed as torsional pulses to the transmission and rotor systems.

The general purpose of this invention is to provide a helicopter with aircraft engine support apparatus which possesses nearly all the advantages of similar engine support devices as employed in propeller-driven aircraft and possesses none of the disadvantages heretofore thought to be inherent in helicopter installations. To attain this, the present invention employs a unique spacer strut and associated bearing assembly whereby lateral, or "yawing," oscillations, such as those generated in a flat, opposed-cylinder aircraft engine, are freely permitted. Further, the present assembly is tilt-permitting, yet so co-operates with the "Dynafocal" shock-mounts that pitching of the engine due to belt restraint results in no large crankshaft movements. Although the driving sheave end of the engine is restrained from vertical translation, so that vertical accelerations result in some pitching angle of the engine, even in this condition the "Dynafocal" mounts function in part to avoid excessive pitch angles; and in any event, the moments of the crankshaft are limited to well within their designed values.

Another object is to provide a unique spacer strut and bearing combination which permits the power shaft end of an engine to swing laterally beneath a horizontal transmission shaft to which the engine power is being transmitted.

In the present invention these purposes (as well as others apparent herein) are achieved generally by providing an assembly which supports the aft end of the aircraft engine within the hub of the driving sheave. The assembly includes a suspension bearing mounted on the transmission drive shaft, a spacer strut depending from the suspension bearing a predetermined distance at which a stub shaft extends forwardly from the spacer strut; and a bearing mounted on the stub shaft for engaging the hub of the driving sheave. The bearing is preferably one of the spherical type, permitting substantial degrees of universal tilt of the engine on its shock mountings; while the suspension bearing-mounted strut permits a lateral arcuate movement of the bearing which engages the driving sheave.

Utilization of the present invention will become apparent to those skilled in the art from the disclosures made in the following description of the preferred embodiment of the invention as illustrated in the accompanying drawings, in which:

FIG. 3 is a detailed view, partially in cross section, of the support and belt drive apparatus constituting a preferred embodiment of the invention; and FIG. 4 is a detailed end view of the preferred embodiment apparatus of FIG. 3 including a spring biased tensioning idler cooperating with the belt-drive apparatus.

Figure 1:
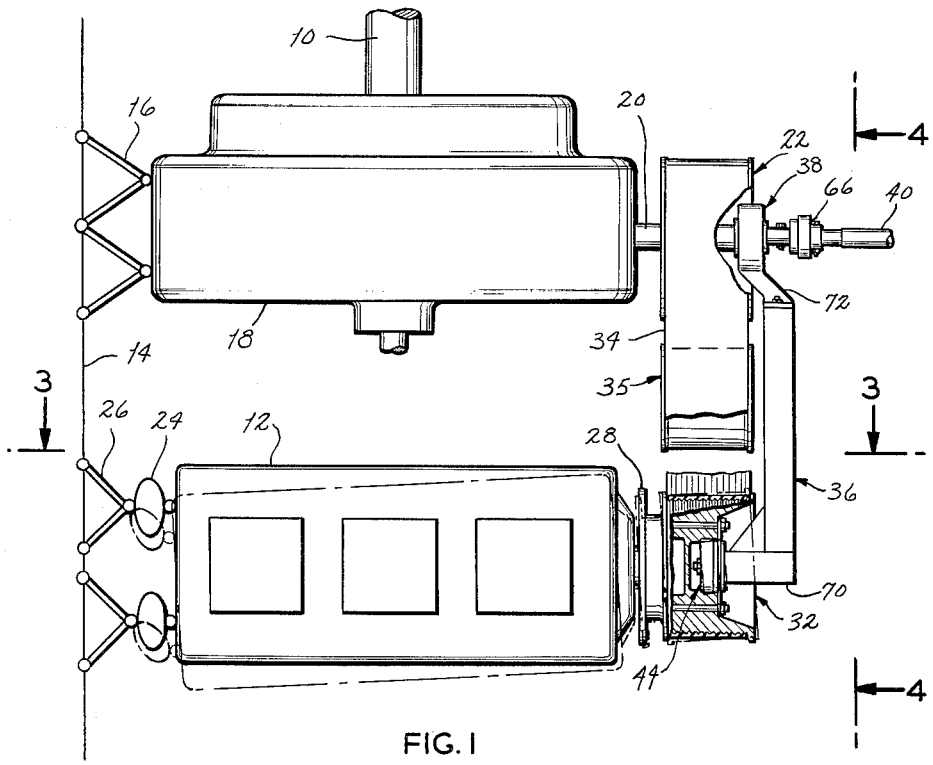
FIG. 1 is a diagrammatic side view of a resiliently mounted helicopter engine coupled to a power transmission by the support structure of the present invention and shown deflected under conditions of vertical acceleration, the deflected position being shown by dashed lines.

Referring now to the drawings, wherein like reference characters designate like or corresponding parts throughout the several views, FIG. 1 illustrates generally the deflection experienced by an elastically mounted aircraft engine under conditions of vertical acceleration, and the fitting at its aft-end which effectively accommodates this deflection. In FIG. 1 there is shown a main rotor shaft 10 of a helicopter which delivers power developed at the engine 12 to the main sustaining rotor (not shown). Since the main sustaining rotor supplies the aerodynamic forces required in flying the helicopter, the aircraft, as a whole, is in essence supported by the main rotor shaft 10. Members of the aircraft which are mounted thereto and to each other with a relatively great degree of firmness or rigidity include the firewall 14, transmission support trusses 16, and transmission gearbor 18. The gearbox 18 supports a transmission shaft 20, to which an annular driven sheave 22 is affixed.

Positioned directly below the main rotor shaft 10 and the transmission gearbox 18 is the engine 12 which is elastically mounted by rubber shock mounts or bushings 24 to truss supports 26 projecting from the firewall 14. This elastic shock mounting of the forward end of the engine 12 permits deflection from its normal static horizontal position, as represented by the solid lines, to that deflected position indicated by the dotted lines of FIG. 1, as hereinafter described.

At its aft end the engine 12 is provided with a crankshaft flange 28 projecting annularly from the end of its crankshaft 30. The crankshaft 30 extends into the hub portion of a driving sheave 32 and is there rigidly secured by bolting it to the crankshaft flange 28. Belt means 34, which may be of one-piece or multiple V-belt type is provided to couple the driving sheave 32 and the driven sheave 22. This belt means 34 tends to lift up the aft end end of the engine 12 as the belt supply of power to the transmission system is increased. If no belt was present and the shock mounts 24 permitted uncoupled vertical translating, vertical acceleration of the helicoper would produce only vertical deflection of the engine at the shock mounts 24. An untiltable bearing support at the driving sheave 32 would prevent this deflection and cause substantial bending moments in the crankshaft 30. The conventionall spring-biased idler wheel assembly generally designated 35, used in usual fashion to control the slack in the belt means 34 and permit changing of the belts, would not greatly alter this condition. The support apparatus of the present invention avoids build-up of crankshaft bending stresses, by permitting tilting of the aft end of the engine relative to the support apparatus, in the manner hereinafter described.

Figure 2:
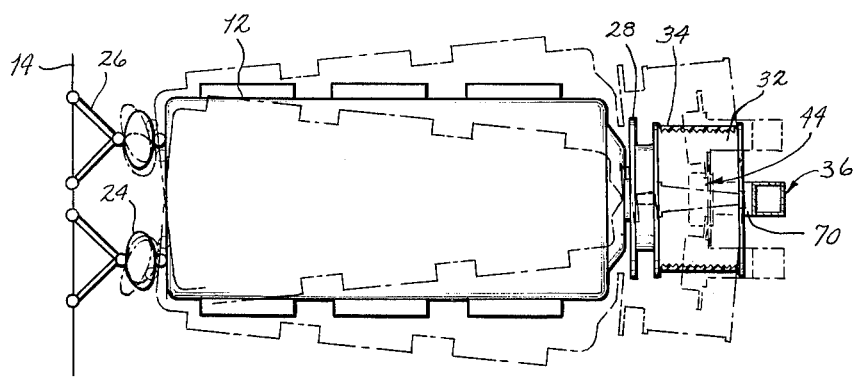
FIG. 2 is a diagrammatic plan view of the engine of FIG. 1 taken as indicated by the line 3—3 of FIG. 1 and showing the lateral displacement of the aft end of the engine and its angular displacement under conditions of lateral acceleration and oscillatory movement.

In FIG. 2 is illustrated deflection of the engine 12, resulting from combined yawing oscillations of the engine and lateral acceleration of the helicopter. (If, instead, such loads were applied separately, the present invention would permit the shock mounting system to respond thereto without coupling; for example, an applied yawing moment would result in only yawing oscillations about a vertical axis through the engine center of gravity.) It is desirable to permit the engine to deflect in response to these oscillations and accelerations without transferring impulses from such movement to the transmission and rotor system. The present invention permits the engine mounts to absorb such impulse motions and substantially isolate the transmission and rotor systems therefrom.

The support apparatus employed may be described generally as rigid means rotatably supported at the axis of the driven sheave 22 and extending to the hub of the driving sheave 32, to establish an absolute distance of separation therebetween. In the embodiment illustrated it comprises a support strut 36 having at its upper end a support bearing generally designated 38 which is mounted on the transmission shaft 20 forward of its tail rotor shaft coupling. At its other end the support strut 36 is provided with a horizontally forward-extending support stub 70 which mounts at its end bearing means, such as the spherical bearing 44. The bearing means 44 engages the hub portion 50 of the driving sheave 32 to permit universal angular tilting of the driving sheave 32 and crankshaft 30. This permits the deflection of the engine 12 as illustrated in FIG. 1. The support bearing 38 permits the support strut and hub 44 to swing in an arc about the transmission shaft 20, whereby the movement of the engine 12 illustrated in FIG. 2 is permitted; likewise, either yawing or lateral movements separately.

Having set forth generally the environment in which the present invention is utilized, and shown schematically its construction and operation, a detailed description of the elements thereof and their coaction will now be presented. In FIG. 3 there is shown the crankshaft flange 28 having six hub-mounting bores 46 spaced apart at 60° intervals to receive bolts 48. Parallel bores 60 extend axially through the hub portion 50 in alignment with the hub-mounting bores 46 of the crankshaft flange 28. The bolts 48 extend through the hub-mounting bores 46 and parallel bores 60 to securely affix the driving sheave 32 to the crankshaft flange 28. The crankshaft 30 extends beyond the flange 28 to be received within the hub portion 50 of the driving sheave 32.

Inwardly of the circle of bolts 48, the hub portion 50 has at its forward end an inwardly extending annular flange 52 which circumferentially engages the end of the crankshaft 30, to align the sheave 32 therewith and aid in the support of the crankshaft 30. At the aft end of the hub portion 50, there is provided a counterbore 54 of sufficient diameter to receive the bearing means 44 presented against a retaining shoulder 55, at which the counterbore diameter is reduced.

The outer annular portion 56 of the driving sheave 32 has a plurality of closely spaced annular ridges 58 defining V-shaped valleys therebetween. These ridges 58 are adapted to receive and transmit motion to the belt means 34 drawn beneath the driving sheave 32.

Aligned directly above the engine 12 and its driving sheave 32 is the transmission gearbox 18 and its driven sheave 22. The driven sheave 22 has a hub portion 62 which is securely attached to the transmission shaft 20 by conventional means, as for example, a keyed drive connection, not shown. Aft of the driven sheave 22, the axially extending transmission shaft 20 is coupled by a universal coupling 66 to the tail rotor drive shaft 40.

Intermediate between the center of the driven sheave 22 and the universal coupling 66, the rigid means hereinbefore referred to are suspended from the transmission shaft 20. Included in this rigid means are the metal spacer strut 36 which may be a rectangular cross-section tube, as illustrated, which depends a predetermined distance to terminate in a horizontally extending support means, in this instance a tubular metal stub shaft 70. The stub shaft 70 is positioned along the center-line axis of the driving sheave 32 and supported by a welded support web 78 forward of the point where it intersects the spacer strut 36. This stub shaft 70 extends forward along the rotational axis of the driving sheave 32 and into the counterbore 54 provided in the hub portion 50.

At its top end the spacer strut 36 is provided with a part 72 offset forwardly and extending within the aft rim of the driven sheave 22 to engage the suspension bearing 38, hereinabove referred to, on the transmission shaft 20. This suspension bearing 38 consists of a roller bearing assembly 74 mounted within an annular housing portion 76 of the part 72, to thereby permit the rigid means, including the spacer strut 36, to move in an arc about the rotational axis of the driven sheave 22.

Referring now to the lower end of the spacer strut 36; housed within the counterbore 54 of the hub portion 50 and mounted on the stub shaft 70 at the intersection of the radial and axial centers of the driving sheave 32 is the tilting bearing means 44. This is preferably a spherical bearing which engages the retaining shoulder 55 and the interior surface of the hub portion 50 to permit tilting movement of the driving sheave 32 relative to the support stub shaft 70. This tilting of the driving sheave 32 about its radial and axial center permits the free angular movement of the aft end of the crankshaft 30 in accordance with the oscillations and deflections of the engine 12 about its rubber bushings 24. The spherical bearing 44 is provided with an outer race part 80 which is free to tilt universally. Aft of this outer race part 80, there is provided conventional sealing means 82 urged against the spherical bearing 44 by a mounting plate 84. The mounting plate 84 has bores 85 spaced therein which align with and permit assembly by means of the sheave mounting bolts 48. An annular retention plate 86 is drawn against the forward end of bearing means 44 by an axial centerline bolt 88 and a locking plate 90 provided aft of an inwardly extending retention lip 89 of the hollow stud shaft 70.

The length of the spacer strut 36 in relation to the rigid transmission shaft 20 is chosen such that, in the absence of engine deflections from the stable position, the engine is supported by its shock mounts 24 without any substantial load being carried by the spacer strut 36. However, when the engine experiences deflections, the strut 36 and bearing means 44 coact to permit both tilting and arcuate movement of the driving sheave 32 and aft end of the engine 12. As the crankshaft 30 and crankshaft flange 28 rotate, the belt means 34 which transfers the power from the driving sheave 32 to the transmission shaft 20 via the driven sheave 22, does so without diminished effectiveness, as would follow if absolute spacing had not been established. The non-coupling "Dynafocal" mounts tend to minimize pitching deflection of the engine, despite the belt tension. There is not only no crankshaft moment at the driving sheave 34, but a minimum build-up in movement forward of it.

Lateral and yawing oscillatory movements of the engine 12 are accommodated by the cooperation of the spacer strut 36 and the suspension bearing 44 which allows the driving sheave 32 and aft end of engine 12 to move arcuately about the rigid transmission shaft 20, as reflected in the phantom lines of the plan view, FIG. 2. As the driving sheave 32 moves in the arc permitted by the coaction of the spacer strut 36 and the support bearing 74, it deflects tiltably about its mounting point, that is, the point of intersection between its axial and radial center.

Thus, it may be seen that the present support apparatus, including the spacer strut 36, the support bearing 74, and the spherical bearing 44, permit such varied movements as lateral displacements of the aircraft engine 12 and angular displacements which tend to tilt the driving sheave 32 on the engine crankshaft. As such, it permits substantially effective use in helicopters of the "Dynafocal" or other non-coupling shock mount system whose design was correlated with that of the engine for propeller-type aircraft.

Obviously, many modifications and variations of the present invention are possible in light of the above teachings. It is therefore to be understood that, within the scope of the appended claims, the invention may be practiced otherwise than is specifically described.

We claim:

1. An improved mounting system of the type including an engine having deflectable mounts at one end and whose power is exerted by the rotation of a shaft, a driving sheave mounted thereon at the other end, a transmission shaft supported parallel thereabove, a driven sheave mounted on the transmission shaft, and belt means coupling the driving and driven sheaves characterized by, the improvement comprising
 a suspension bearing mounted on the transmission shaft,
 a spacer suspension strut housing said suspension bearing at its upper end and depending a predetermined distance,
 a stub shaft affixed to said spacer strut at said predetermined distance and extending forward therefrom toward the engine shaft,
 and a bearing mounted on the forward end of said stub shaft supporting the hub of the driving sheave aft of the engine shaft,
 whereby said end of the engine is supported from the transmission shaft and the driving sheave is restrained in its radial displacement relative to the driven sheave and vibratory deflections of the engine mounts are absorbed in oscillations arcuately about the transmission shaft.

2. The improved apparatus of claim 1, wherein the bearing mounted on said stub shaft is a spherical bearing which permits free tilting of said driving sheave and the engine shaft to which it is affixed.

3. The improved apparatus of claim 2, wherein the said stub shaft and spacer strut position said spherical bearing at the radial and axial center of said driving sheave.

4. The improved apparatus of claim 3, wherein said driving sheave has a hub portion including at its aft end a counterbore of sufficient diameter to receive said spherical bearing means, and
 a mounting plate abutting the aft end of said spherical bearing means to retain it within said hub portion counterbore.

5. The improved apparatus of claim 4 adapted for mounting to an engine of this type having on its shaft forwardly of the end thereof a flange including hub-mounting bores, wherein
 said hub portion further has axial, parallel bores spaced away from its center,
 and said mounting plate has bores aligned with said hub portion bores, together with
 bolt-like means through said mounting plate bores and said aligned hub portion bores and engaging such hub-mounting bores of the shaft flange.

6. The improved apparatus of claim 5, wherein said hub portion has at its forward end an inwardly extending annular flange presented supportingly against that end of the engine shaft projecting aft of such crankshaft flange.

7. A helicopter power transmission system, comprising
 an engine having at its forward end deflectable shock mounting means by which it is supported onto the helicopter frame and having extending from its aft end a crankshaft,
 a transmission mounted onto the helicopter frame and having a transmission shaft positioned above said engine,
 a tail rotor drive shaft having a coupling engaging the aft end of said transmission shaft,
 a driving sheave having a hub portion fixedly secured to the end of the engine crankshaft and extending therebeyond
 a driven sheave mounted for rotation on said transmission shaft forwardly of the coupling to the tail rotor drive shaft,
 belt means in driving contact with said driving and driven sheaves for transmitting rotation of said driving sheave to said driven sheave,
 a suspension bearing mounted on the transmission shaft between the mounting of the driven sheave and the coupling to the tail rotor drive shaft,
 a spacer strut housing said suspension bearing at its upper end and depending a predetermined distance therefrom,
 a stub shaft affixed to said spacer strut at the said predetermined distance and extending forward therefrom, and
 a bearing mounted on said stub shaft and engaging within the hub of the driving sheave aft of the engine crankshaft,
 whereby the aft end of the engine is supported from the transmission shaft and the driving sheave is restrained in its vertical displacement relative to the driven sheave and vibratory deflections of the engine shock mounting means are absorbed in oscillations arcuately about the transmission shaft.

8. The power transmission system as defined in claim 7, wherein
 the bearing mounted on said stub shaft is a spherical bearing whereby the engine is free to deflect tiltably on its shock mounting means.

9. Engine support and belt-drive apparatus for a resiliently-mounted engine whose crankshaft drives a transmission power shaft, comprising
 a driving sheave means having a hub portion fixedly engaging the engine crankshaft,
 driven sheave means fixedly mounted on the transmission power shaft,
 belt means in driving contact with said driving and driven sheave means for transmitting rotation of said driving sheave to said driven sheave, and
 rigid means suspended swingably at the axis of the driven sheave means for establishing an absolute distance of separation between the axes of rotation of said driving and driven sheave means,
 said rigid means having tilt-permitting bearing means to support the engine crankshaft at the driving sheave.

References Cited by the Examiner

UNITED STATES PATENTS

| | | | |
|---|---|---|---|
| 412,616 | 10/1889 | Hess | 74—228 X |
| 984,953 | 2/1911 | Matthews | 74—228 |
| 1,612,043 | 12/1926 | Nonneman | 74—228 |
| 2,537,120 | 1/1951 | Collis | 74—216.5 |
| 2,549,247 | 4/1951 | Scott. | |
| 2,814,207 | 11/1957 | Weaver | 74—216.5 |
| 2,883,157 | 4/1959 | Gallatin | 74—219 |
| 3,051,010 | 4/1962 | Blomgren et al. | 74—228 X |
| 3,094,005 | 6/1963 | Pressler | 74—216.5 X |
| 3,145,575 | 8/1964 | Bellmann | 74—228 |

DAVID J. WILLIAMOWSKY, *Primary Examiner.*

DON A. WAITE, *Examiner.*

J. A. WONG, *Assistant Examiner.*